(12) United States Patent
Itou

(10) Patent No.: US 9,302,561 B2
(45) Date of Patent: Apr. 5, 2016

(54) MOUNT STRUCTURE FOR VEHICLE DAMPER AND MOUNT INSTALLATION METHOD FOR VEHICLE DAMPER

(71) Applicant: HONDA MOTOR CO., LTD., Minato-Ku, Tokyo (JP)

(72) Inventor: Sumitaka Itou, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/353,984

(22) PCT Filed: Oct. 15, 2012

(86) PCT No.: PCT/JP2012/076583
§ 371 (c)(1),
(2) Date: Apr. 24, 2014

(87) PCT Pub. No.: WO2013/061809
PCT Pub. Date: May 2, 2013

(65) Prior Publication Data
US 2014/0299736 A1 Oct. 9, 2014

(30) Foreign Application Priority Data

Oct. 28, 2011 (JP) ................................ 2011-236846

(51) Int. Cl.
*B60G 13/00* (2006.01)
*B60G 15/06* (2006.01)
(Continued)

(52) U.S. Cl.
CPC ............ *B60G 15/067* (2013.01); *B60G 13/003* (2013.01); *F16F 9/54* (2013.01); *F16F 9/58* (2013.01); *B60G 2204/128* (2013.01); *B60G 2204/41* (2013.01); *Y10T 29/49826* (2015.01)

(58) Field of Classification Search
CPC ........... B60G 13/003; B60G 2204/128; B60G 15/067; B60G 2204/4404; B60G 2204/4502; B60G 2204/4602; F16F 9/54
See application file for complete search history.

(56) References Cited

U.S. PATENT DOCUMENTS 5,158,269 A * 10/1992 Hein et al. ..................... 267/220
5,248,134 A * 9/1993 Ferguson et al. .............. 267/220
(Continued)

FOREIGN PATENT DOCUMENTS

CN 1495371 A 5/2004
CN 1803484 A 7/2006
(Continued)

OTHER PUBLICATIONS

Chinese Office Action dated Feb. 3, 2015 issued in connection with the corresponding Chinese Patent Application No. 2012-80052763.X.

*Primary Examiner* — Bradley Duckworth
(74) *Attorney, Agent, or Firm* — Carrier Blackman & Associates, P.C.; Joseph P. Carrier; William D. Blackman

(57) ABSTRACT

A mount structure for a vehicle damper is provided with: an upper damper mount (26) and a lower damper mount (28) which grip a body panel (16) in the vertical direction; a collar member (40) penetrating through the upper damper mount (26) and the lower damper mount (28); a pair of gripping members (42a, 42b) for gripping both the upper damper mount (26) and the lower damper mount (28) from the outside; a fastening member (44) for fastening and integrating each of the collar member (40), the upper damper mount (26), and the lower damper mount (28) to a piston rod (18); and a transmission member (46) gripped between the upper damper mount (26) and the lower damper mount (28) and transmitting to the body panel (16) an input transmitted from the damper body (14) side.

16 Claims, 3 Drawing Sheets

(51) Int. Cl.
*F16F 9/54* (2006.01)
*F16F 9/58* (2006.01)

(56) References Cited

U.S. PATENT DOCUMENTS

| | | | |
|---|---|---|---|
| 5,456,454 A * | 10/1995 | Schulz et al. | 267/293 |
| 5,544,725 A * | 8/1996 | Handke et al. | 267/221 |
| 5,628,388 A * | 5/1997 | Angermann | 188/321.11 |
| 5,641,152 A * | 6/1997 | Angles et al. | 267/220 |
| 5,762,313 A * | 6/1998 | Siemer | 248/635 |
| 6,076,794 A * | 6/2000 | Pradel | 267/220 |
| 6,244,607 B1 * | 6/2001 | Nishino | 280/124.107 |
| 6,427,814 B1 * | 8/2002 | Miyamoto | 188/321.11 |
| 6,616,160 B2 * | 9/2003 | Tadano | 280/124.147 |
| 6,666,439 B2 * | 12/2003 | Romer | 267/220 |
| 6,776,402 B2 * | 8/2004 | Miyamoto et al. | 267/220 |
| 6,786,646 B2 * | 9/2004 | Handke | 384/617 |
| 6,883,651 B2 * | 4/2005 | Fukaya | 188/322.12 |
| 7,066,456 B2 * | 6/2006 | Hodumi | 267/220 |
| 7,108,253 B2 * | 9/2006 | Venton-Walters et al. | 267/220 |
| 7,172,182 B2 * | 2/2007 | Huprikar et al. | 267/293 |
| 7,178,795 B2 * | 2/2007 | Huprikar et al. | 267/141.1 |
| 7,347,414 B2 * | 3/2008 | Groves | 267/220 |
| 7,350,779 B2 | 4/2008 | Tamura | |
| 7,938,418 B1 * | 5/2011 | Coombs et al. | 280/124.147 |
| 8,246,021 B2 * | 8/2012 | Shand et al. | 267/140.13 |
| 8,333,269 B2 * | 12/2012 | Dickson et al. | 188/321.11 |
| 8,439,336 B2 * | 5/2013 | Moore et al. | 267/220 |
| 8,534,649 B2 * | 9/2013 | Abe et al. | 267/220 |
| 8,556,281 B2 * | 10/2013 | Lee et al. | 280/124.155 |
| 8,668,213 B2 * | 3/2014 | Takagi et al. | 280/124.147 |
| 8,813,924 B2 * | 8/2014 | Matsumura | 188/321.11 |
| 2004/0041320 A1 | 3/2004 | Hodumi | |

FOREIGN PATENT DOCUMENTS

| | | |
|---|---|---|
| EP | 1122102 A2 | 8/2001 |
| JP | S58-45107 U | 3/1983 |
| JP | H07117712 A | 5/1995 |
| JP | 2001-065624 A | 3/2001 |
| JP | 2004069018 A | 3/2004 |
| JP | 2009-196574 A | 9/2009 |
| JP | 4716556 B2 | 7/2011 |

* cited by examiner

MOUNT STRUCTURE FOR VEHICLE DAMPER AND MOUNT INSTALLATION METHOD FOR VEHICLE DAMPER

TECHNICAL FIELD

The present invention relates to a mount structure for a vehicle damper and a mount installation method for a vehicle damper, wherein the damper is an input separation type to which input of vibration from a piston rod and input of vibration from a damper main body are separated from each other.

BACKGROUND ART

For example, Patent Document 1 discloses a damper mount structure that damps input of vibration from a damper in a process where vibration is transferred to a vehicle body. For the damper mount structure disclosed by Patent Document 1, adopted is an input separation type in which an inner elastic body for damping vibration, which is input from a piston rod, and a member for supporting the vehicle body load, for example, an outer elastic body for damping vibration transferred from a suspension spring (coil spring) to the vehicle body side are provided being separated from each other.

Further, as a conventional technology, there is known a structure of an input separation type for damping input from a bump stop rubber to which a shock is applied at the time of damper compression in addition to input from a suspension spring, separating these inputs from input from a piston rod.

In case that input from a piston rod and input from a bump stop rubber (damper main body side) are input with concentration (in combination) to one elastic member, the elastic member is compressed to a degree causing immediate losing of the compression margin, and if further input is applied in the state that the compression margin is lost, it is possible that damping effect against vibration cannot be obtained by the elastic member.

In this situation, for a damper mount structure of an input separation type, by separating input, which is from the piston rod, and input, which is from the damper main body side, from each other, the combined input of the both is prevented from being applied to the elastic member (damper mount) so that the damping effect by the damper mount is appropriately obtained, leaving the compression margin of the elastic member.

RELATED ART DOCUMENT

Patent Document

Patent Document 1: Japanese Patent Application Laid-Open No. 2001-65624

DISCLOSURE OF THE INVENTION

Problems to be Solved by the Invention

In Patent Document 1 in which a damper mount structure of such an input separation type is adopted, adopted is a structure in which the piston rod is fixed by a fastening nut to the inner cylinder, and an outer bracket to which input from the suspension spring (coil spring) is transferred is attached to the vehicle body by plural bolts.

However, in the damper mount structure disclosed by Patent Document 1, the inner fastening section fastened by the fastening nut and the outer fastening section fastened by the plural bolts are separated from each other. Such separation of a fastening section into an inner fastening section and an outer fastening section makes the fastening work complicated. Further, the damper mount structure disclosed by Patent Document 1 requires a space for attaching the bolts for fixing the outer bracket to the vehicle body and decreases the freedom of layout on the vehicle body side.

An object of the invention, in general, is to provide a mount structure for a vehicle damper and a mount installation method for a vehicle damper which make the fastening work of various members simple and easy.

A primary object of the invention is to provide a mount structure for a vehicle damper and a mount installation method for a vehicle damper which enable improvement in the degree of freedom of the layout on the vehicle body side.

Means for Solving the Problems

In order to attain the above-described object, according to the present invention, provided is a mount structure for a vehicle damper wherein a damper main body is configured by a damper body and a piston rod whose end portion is supported by a member on a vehicle body side, the mount structure including: an upper elastic body and a lower elastic body that are externally fitted to the piston rod and sandwich the member on the vehicle body side; a collar member that is externally fitted to the piston rod, penetrates through the upper elastic body and the lower elastic body, and defines fastening allowances of the upper elastic body and the lower elastic body; a pair of sandwiching members that are provided at end portions along an axial direction of the collar member and respectively sandwich the upper elastic body and the lower elastic body from an external direction; a fastening member for integrally fastening the collar member, the upper elastic body, and the lower elastic body to the piston rod; and a transfer member that is disposed coaxially with an axial direction of the piston rod and is sandwiched between the upper elastic body and the lower elastic body to transfer input from the damper body side to the member on the vehicle body side.

According to the invention, an input separation type is adopted, wherein the input route of vibration from the damper body side and the input route of vibration from the piston rod are separated from each other. That is, although input from the piston rod is transferred to the upper elastic body and the lower elastic body, input from the damper body side is transferred little to the upper elastic body and the lower elastic body because the input from the damper body side is transferred to the member on the vehicle body side through the transfer member.

On the other hand, according to the invention, various members constructing the vehicle damper, such as the pair of sandwiching members, the collar member, the transfer member, the upper elastic body, the lower elastic body, and the like are supported at one point by the fastening member fastened at one end portion of the piston rod. Thus, it is possible to simply and easily carry out the fastening work of the various members and improve the degree of freedom of layout on the vehicle body side.

In such a manner, according to the invention, fastening work on the vehicle damper can be reduced, the workability can be improved. Further, an input separation structure is adopted. Thus, it is possible to reduce a drop in the damping performance which would be caused in such a manner that the upper elastic body and the lower elastic body easily become into a compressed state. As a result, according to the invention, it is possible to suitably combine (attain the both) improvement in the fitting workability of various members constructing the vehicle damper and ensuring desired antivibration performance (damping performance) of the upper elastic body and the lower elastic body.

Further, according to the invention, the member on the vehicle side includes a penetration hole for making the piston rod penetrate through and a protruding portion protruding from a circumferential marginal portion of the penetration hole toward the damper main body side, wherein the transfer member is sandwiched between the lower elastic body and the protruding portion, and wherein either the upper elastic body or the lower elastic body includes an extended portion extended along the axial direction of the piston rod and disposed between the protruding portion, the collar member, and the transfer member.

According to the invention, arrangement is made such that, for example, when vibration along the vehicular longitudinal direction/the vehicular lateral direction is input, the outer circumferential surface of either the upper elastic body or the lower elastic body comes into contact with the inner circumferential surface of the protruding portion fixed to the member on the vehicle body side. Thus, according to the invention, the surface pressure can be decreased by increasing the contact area of the outer circumferential surface of either the upper elastic body or the lower elastic body, compared with a case of contact with the inner circumferential surface of the penetration hole of the member on the vehicle body side formed merely by a thin plate. As a result, according to the invention, even when a soft material, for example, urethane rubber (particularly, urethane foam rubber) or the like is used as the upper elastic body and the lower elastic body, vibration having been input from the vehicular longitudinal direction/the vehicular lateral direction can be appropriately absorbed and reduced.

Still further, according to the invention, a surface of the transfer member, the surface facing the protruding portion, is provided with a buffer member.

According to the invention, by interveningly arranging a buffer member, for example, of rubber between the protruding portion on the vehicle body side and the transfer member, it is possible to reduce generation of abnormal sound caused by collision between metallic members, even when both the protruding portion and the transfer member are formed by metallic materials, and it is also possible to reduce sliding movement between the protruding portion and the transfer member, and thereby reduce movement of the transfer member relative to the protruding portion caused by input from outside.

Yet further, according to the invention, the piston rod includes a smaller diameter portion formed with a smaller outer diameter than another outer diameter of the piston rod, wherein the upper elastic body, the lower elastic body, the collar member, the sandwiching member, and the transfer member are externally fitted to the smaller diameter portion, wherein a stepped portion is provided between an inner end portion along an axial direction of the smaller diameter portion and a side surface of the piston rod having the other outer diameter, wherein a support member for supporting the sandwiching member at the stepped portion is provided between the stepped portion and the sandwiching member, and wherein the support member is separately formed from the sandwiching member or integrally formed with a lower surface of the sandwiching member.

According to the invention, by providing a support member formed separately from the sandwiching member or integrally formed with the lower surface of the sandwiching member such that the support member is supported by the stepped portion, the various members, such as the upper elastic body and the lower elastic body, are externally fitted to the smaller diameter portion of the piston rod. Thus, it is easy to perform positioning of the various members along the axial direction of the piston rod. Herein, it is possible to reduce the manufacturing cost and improve the installability by integrally forming the support member with the sandwiching member (by expanding the bottom surface of the lower sandwiching member to form the support member) to decrease the number of components.

Further, according to the invention, provided is a mount installation method for a vehicle damper whose damper main body is configured by a damper body and a piston rod whose end portion is supported by a member on a vehicle body side, the mount installation method including: a process of externally fitting a lower sandwiching member, a collar member, and a lower elastic body to the piston rod, and thereafter externally fitting a transfer member to the lower elastic body from above to construct a lower assembly; and a process of inserting the lower assy through a penetration hole of the member on the vehicle body side from below the member on the vehicle body side, externally fitting an upper elastic body and an upper sandwiching member to one end portion of the piston rod from above the member on the vehicle body side, the piston rod penetrating through the member of the vehicle body, and thereafter fastening a fastening member to a tip end portion of the piston rod.

According to the invention, using such an installation method, by only externally fitting a transfer member to the lower elastic body from above, easy installation is enabled, which realizes both installability and input separation. Further, using this installation method, various members constructing the vehicle damper, such as the pair of sandwiching members, the collar member, the transfer member, the upper elastic body, the lower elastic body, and the like are supported at one point by the fastening member fastened at the front end portion of the piston rod. Thus, it is possible to simply and easily carry out the fastening work of the various members and improve the degree of freedom of layout on the vehicle body side.

Advantages of the Invention

According to the present invention, it is possible to obtain a mount structure for a vehicle damper and a mount installation method for a vehicle damper which make the fastening work of various members easy and simple and enable improvement in the degree of freedom of the layout on the vehicle body side.

EMBODIMENT FOR CARRYING OUT THE INVENTION

Figure 1:
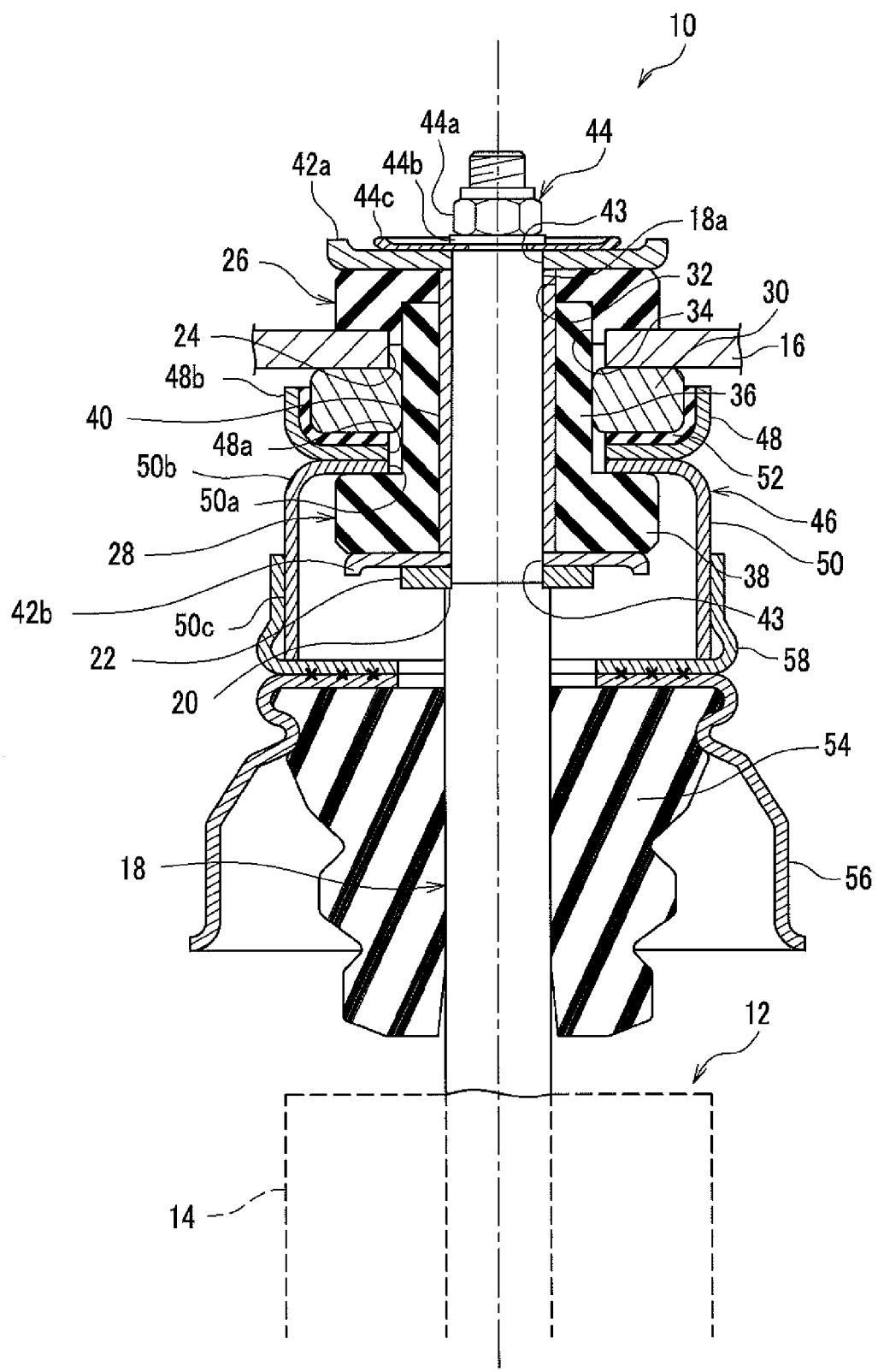
FIG. 1 is a partially omitted vertical cross-sectional view of a damper for a vehicle to which a mount structure in an embodiment according to the present invention is applied.

An embodiment according to the present invention will be described below in detail, referring to the drawings, as appropriate. FIG. 1 is a partially omitted vertical cross-sectional view of a damper for a vehicle to which a mount structure in an embodiment according to the present invention is applied.

As shown in FIG. 1, a vehicle damper 10 includes a damper main body 12, wherein the damper main body 12 is provided with a damper body 14 formed substantially in a cylindrical shape, and a piston rod 18 whose lower end portion is connected with a piston, not shown, movably housed in the damper body 14 and whose upper end portion is connected (supported) with a body panel (a member on a vehicle body side) 16 of a vehicle, not shown. Incidentally, the damping chamber of the damper body 14 is filled with pressure oil, not shown.

The piston rod 18 has a smaller diameter portion 18a at one end portion thereof along the axial direction, the smaller diameter portion 18a being formed with a smaller diameter than another diameter of the piston rod 18, and an annular stepped portion 20 is formed between the smaller diameter portion 18a and the side surface of the piston rod 18 having the other diameter, the annular stepped portion 20 being formed at the inner end portion along the axial direction of the smaller diameter portion 18a. A later-described washer 22 is attached to this stepped portion 20, and the washer 22 is supported by the stepped portion 20 so that downward displacement of the washer 22 is restricted.

Incidentally, in the present embodiment, the washer 22 having a function as a support member is arranged as a separate body from a later-described pair of sandwiching members 42a, 42b and is stopped by the stepped portion 20, however, the washer 22 may be formed integrally with the lower sandwiching member 42b.

A body panel 16 is provided with a penetration hole 24 for making the upper end portion of the piston rod 18 penetrate through. Further, at the body panel 16, there are provided an upper damper mount (upper elastic body) 26 and a lower damper mount (lower elastic body) 28, which are externally fitted (inserted) to the outer circumferential surface of the piston rod 18 and have an anti-vibration function by sandwiching the body panel 16 through the penetration hole 24 from the above and the below. Still further, on the lower surface of the body panel 16, provided is a protruding portion 30, of a metal ring body, that protrudes from the marginal portion of the penetration hole 24 toward the damper main body 12 side (lower side) and surrounds the outer circumferential surface of the piston rod 18.

Incidentally, in the present embodiment, the protruding portion 30 is formed separately from the body panel 16 and is fixed to the bottom surface portion of the body panel 16, for example, by welding, however, the protruding portion 30 may be substituted by an expansion portion in a ring shape to be formed on the bottom surface of the body panel 16 integrally with the body panel 16.

The upper damper mount 26 and the lower damper mount 28 are formed respectively, for example, by an elastic material such as a soft urethane rubber. The upper damper mount 26 is a substantially annular body having a hole portion 32 whose central portion the piston rod 18 penetrates through. The central portion of the bottom surface of the upper damper mount 26 is provided with an annular recession portion 34, wherein a part of the lower damper mount 28 is inserted into the annular recession portion 34 and thus located at a predetermined position with respect to the upper damper mount 26.

The lower damper mount 28 extends along the axial direction of the piston rod 18 and has a cylindrical portion (extended portion) 36, wherein the upper end portion of the cylindrical portion 36 is inserted into the annular recession portion 34 of the upper damper mount 26, and the outer circumferential surface of the cylindrical portion 36 contacts the protruding portion 30 on the body panel 16 side. The lower damper mount 28 has a substantially annular body 38 that is formed with a radially expanded diameter on the lower side of the cylindrical portion 36 and with a larger thickness than the cylindrical portion 36. The cylindrical portion 36 and the substantially annular body 38 are integrally formed.

In the present embodiment, the shapes of the upper damper mount 26 and the lower damper mount 28 are differently formed, however, the upper damper mount 26 and the lower damper mount 28 may be formed in the same shape as each other by dividing the cylindrical portion 36 into two portions at the middle part and integrally forming the each divided cylindrical portion and a substantially annular body.

A collar member 40 in a cylindrical shape is provided between the outer circumferential surface of the piston rod 18 and the upper damper mount 26 and between the outer circumferential surface of the piston rod 18 and the lower damper mount 28. The collar member 40 is externally fitted to the piston rod 18, penetrates the upper damper mount 26 and the lower damper mount 28 to define the later-described fastening allowances of the upper damper mount 26 and the lower damper mount 28.

At the both end portions of the collar member 40 along the axial direction, there are provided a pair of sandwiching members 42a, 42b for sandwiching the upper damper mount 26 and the lower damper mount 28 along the axial direction from outside. The central portions of the pair of sandwiching members 42a, 42b are provided with respective penetration holes 43 through which the piston rod 18 penetrates, and the both end portions of the cylindrical collar member 40 contact the peripheral portions of the penetration holes 43 to define the fastening allowance. Incidentally, either of the pair of sandwiching members 42a, 42a and the collar member 40 may be integrally formed.

A fastening member 44 is provided above the body panel 16 to integrally fasten the washer 22, the pair of sandwiching members 42a, 42b, the collar member 40, the upper damper mount 26, and the lower damper mount 28 respectively to the piston rod 18. The fastening member 44 is configured, for example, by a lock nut 44a fastened to the screw portion of the piston rod 18, a washer 44b, a fastening plate 44c, and the like.

A transfer member 46 is provided on the lower side of the body panel 16, wherein the transfer member 46 is disposed coaxially with the axial direction of the piston rod 18 and sandwiched between the upper damper mount 26 and the lower damper mount 28.

The transfer member 46 has a function to transfer input (vibration) from the damper body 14 side to the body panel 16. The transfer member 46 includes a first collar 48 and a second collar 50. The first collar 48 is provided with a first collar 48 provided with a hole portion 48a at the central portion, the hole portion 48a surrounding the cylindrical portion 36 of the lower damper mount 28, and a bent portion 48b at the outer diameter portion, the bent portion 48b bending toward the body panel 16 side. The second collar 50 is provided with a hole portion 50a at the central portion, the hole portion 50a surrounding the cylindrical portion 36 of the lower damper mount 28, a bent portion 50b at the outer diameter portion, the bent portion 50b bending toward the damper body 14 side, and a cylindrical portion 50c, the cylindrical portion 50c extending from the bent portion 50b, wherein are the hole portion 50a, the bent portion 50b, and the cylindrical portion 50c are continuously formed.

Incidentally, the surface of the first collar 48 constructing the transfer member 46 on the upper side, the surface facing the protruding portion 30, is provided with a buffer member 52 of an elastic body, for example, rubber. The buffer member 52 is adhered to the lower side of the protruding portion 30 desirably, for example, by vulcanization. In case that the protruding portion 30 provided on the bottom portion of the body panel 16 and the transfer member 46 (the first collar 48) are both formed by metallic material, it is possible that metal pieces collide with each other to generate abnormal sound. Accordingly, generation of abnormal sound can be reduced by interveningly arranging the buffer member 52 between the protruding portion 30 and the transfer member 46 (first collar 48). This point will be described in detail later.

Further, a bump stop rubber 54 is provided above the damper body 14, wherein the bump stop rubber 54 is formed by an elastic body, for example, rubber, and is fitted to the outer circumferential surface of the piston rod 18. At the upper portion of the bump stop rubber 54, an expanding-opening portion 56 in a skirt shape, which is gradually expanding and opening toward the damper body 14 side and holds (fixes) the bump stop rubber 54, is provided. On the upper side of the expanding-opening portion 56, provided is a holding portion 58 that contacts with the lower end portion of the cylindrical portion 50c of the second collar 50 to surround and hold the outer circumferential surface of the cylindrical portion 50c.

The holding portion 58 on the upper side and the expanding-opening portion 56 on the lower side are integrally joined at the contact part by joining means, for example, spot welding. Incidentally, in a broad sense, the holding portion 58 and the expanding-opening portion 56 function as transfer members to transfer input from the damper body 14 side to the body panel 16.

The vehicle damper 10 to which the mount structure in the present embodiment is applied is structured basically as described above. The operation and effects will be described below.

Figure 2B:
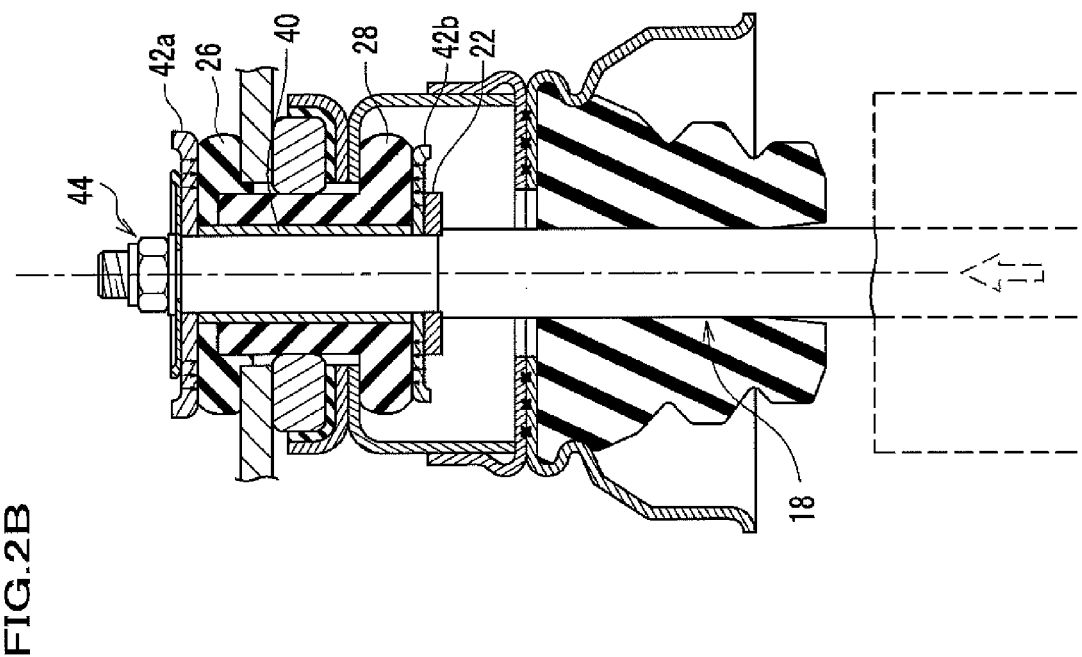
FIG. 2B is a partial vertical cross-sectional view of the damper for a vehicle, showing the input route of vibration from a piston rod.
Figure 2A:
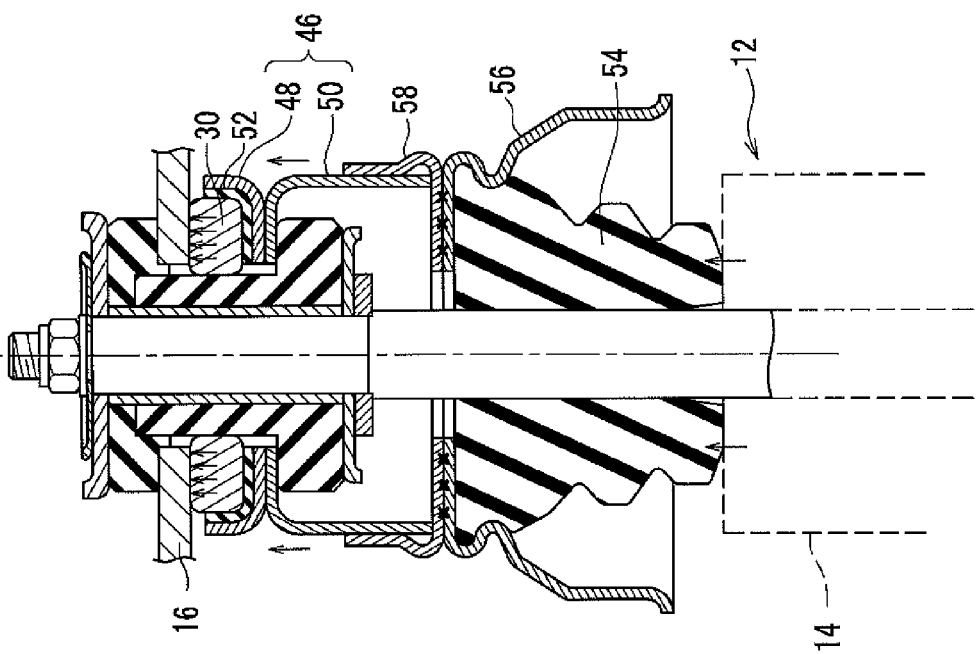
FIG. 2A is a partial vertical cross-sectional view of the damper for a vehicle, showing the input route of vibration from the bump stop rubber (damper body side)

FIG. 2A is a partial vertical cross-sectional view of the damper for a vehicle, showing the input route of vibration from the bump stop rubber (damper body side), and FIG. 2B is a partial vertical cross-sectional view of the damper for a vehicle, showing the input route of vibration from a piston rod.

In the present embodiment, adopted is an input separation type in which the input route of vibration from the bump stop rubber 54 (damper body 14 side) and the input route of vibration from the piston rod 18 are separated from each other. That is, as shown in FIG. 2A, vibration having been input from the bump stop rubber 54 (damper body 14 side) is transferred through the expanding-opening portion 56, the holding portion 58, the second collar 50, the first collar 48, the buffer member 52, and the protruding portion 30 to the body panel 16 fixed to the vehicle body.

On the other hand, as shown in FIG. 2B, vibration having been input from the piston rod 18 is transferred through the washer 22, the collar member 40, the pair of sandwiching members 42a, 42b to the upper damper mount 26 and the lower damper mount 28, and the vibration is damped by the upper damper mount 26 and the lower damper mount 28.

In such a manner, in the present embodiment, although input from the piston rod 18 is transferred to the upper damper mount 26 and the lower damper mount 28, input from the damper body 14 side is transferred through the transfer member 46 formed by the first collar 48 and the second collar 50 to the body panel 16 side. Thus, input from the damper body 14 side is transferred little to the upper damper mount 26 and the lower damper mount 28 (see FIG. 2B).

On the other hand, in the present embodiment, various members, which construct the vehicle damper 10, such as the washer 22, the pair of sandwiching members 42a, 42b, the collar member 40, the transfer member 46 (the first collar 48, the second collar 50), the upper damper mount 26, the lower damper mount 28, and the like are supported at one point by the fastening member 44 fastened at one end portion of the piston rod 18. Thus, it is possible to simply and easily carry out the fastening work of the various members and improve the degree of freedom of layout on the vehicle body side (see FIG. 3).

Accordingly, in the present embodiment, fastening work on the vehicle damper 10 can be reduced, the workability can be improved, and also, an input separation structure is adopted. Thus, it is possible to reduce a drop in the damping performance which would be caused in such a manner that the upper damper mount 26 and the lower damper mount 28 easily become into a compressed state.

As a result, in the present embodiment, it is possible to suitably combine (attain the both) improvement in the fitting workability of various members constructing the vehicle damper 10 and ensuring desired anti-vibration performance (damping performance) of the upper damper mount 26 and the lower damper mount 28.

Incidentally, in the present embodiment, regarding the transfer member 46 formed by the first collar 48 and the second collar 50, it is only necessary to sandwich the transfer member 46 between the upper damper mount 26 and the lower damper mount 28. Accordingly, even when a material unsuitable for quenching, for example, urethane rubber (particularly, urethane foam) is used as the upper damper mount 26 and the lower damper mount 28, it is possible to appropriately dispose the transfer member 46.

Further, in the present embodiment, arrangement is made such that, for example, when vibration along the vehicular longitudinal direction/the vehicular lateral direction is input, the outer circumferential surface of the lower damper mount 28 comes into contact with the inner circumferential surface of the protruding portion 30 fixed to the body panel 16. Accordingly, in the present embodiment, the surface pressure can be decreased by increasing the contact area, compared with a case that the outer circumferential surface of the lower damper mount 28 contacts with the inner circumferential surface of a penetration hole 24 of a body panel 16 formed merely in a thin plate shape.

As a result, in the present embodiment, even when a soft material, for example, urethane rubber (particularly, urethane foam rubber) or the like is used as the upper damper mount 26 and the lower damper mount 28, vibration having been input from the vehicular longitudinal direction/the vehicular lateral direction can be appropriately absorbed and reduced.

Further, in the present embodiment, by interveningly arranging a buffer member 52, for example, of rubber between the protruding portion 30 on the body panel 16 side and the transfer member 46, it is possible to reduce generation of abnormal sound caused by collision between metallic members, even when both the protruding portion 30 and the transfer member 46 are formed by metallic materials, and it is also possible to reduce sliding movement between the protruding portion 30 and the transfer member 46, and thereby reduce movement of the transfer member 46 relative to the protruding portion 30 caused by input from outside.

Still further, in the present embodiment, by supporting the washer 22 by the stepped portion 20 of the piston rod 18, the various members, such as the upper damper mount 26 and the lower damper mount 28, are externally fitted to the smaller diameter portion 18a of the piston rod 18. Thus, it is easy to perform positioning of the various members along the axial direction of the piston rod 18. Incidentally, in the present embodiment, the washer 22 functioning as a support member is structured separately from the pair of sandwiching members 42a, 42b, however, it is possible to reduce the manufacturing cost and improve the installability by integrally forming the washer 22 with the lower sandwiching member 42b (by expanding the bottom surface of the lower sandwiching member 42 to form the washer shape) and thus decreasing the number of components.

Figure 3A:
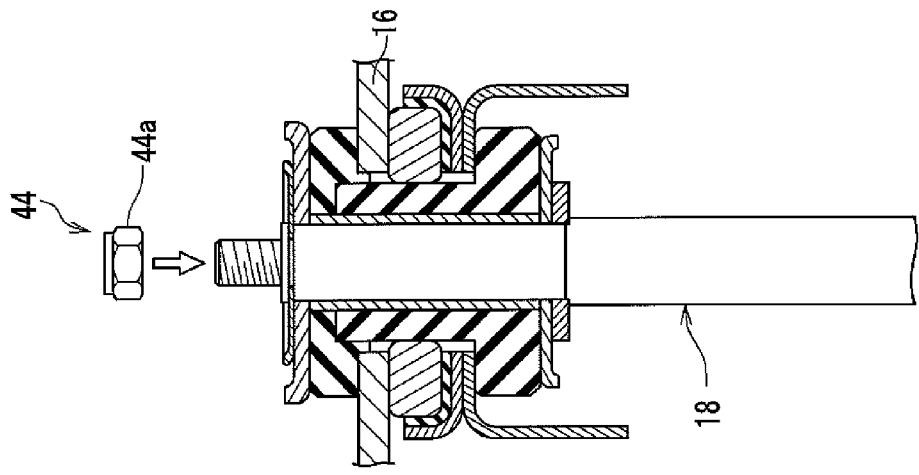
FIGS. 3A to 3C are vertical cross-sectional views showing an installation process of the damper for a vehicle.
Figure 3B:
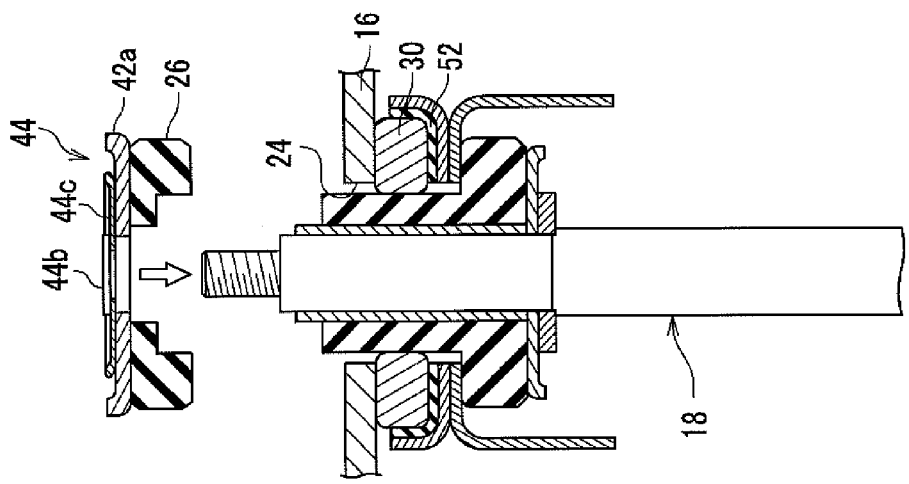
Figure 3C:
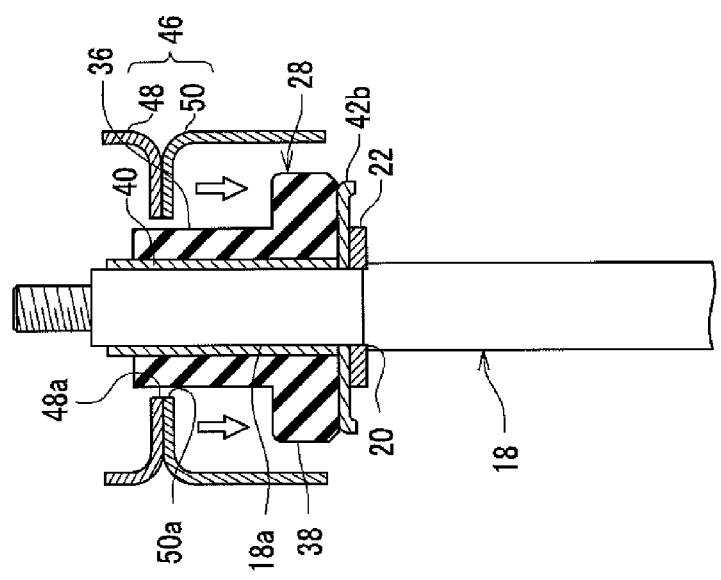

The installation process of the vehicle damper 10 will be described below. FIGS. 3A to 3C are vertical cross-sectional views showing an installation process of the damper for a vehicle.

As shown in FIG. 3A, first, the washer 22 is made supported by the annular stepped portion 20 formed on the outer circumferential surface of the piston rod 18, and then the lower sandwiching member 42b, the collar member 40, and the lower damper mount 28 are externally fitted along the smaller diameter portion 18a of the piston rod 18. Further, the transfer member 46 structured by the first collar 48 and the second collar 50 is externally fitted from the cylindrical portion 36 side of the lower damper mount 28 (from the upper side of the lower damper mount 28) through the hole portions 48a, 50a to be supported by the substantially annular body 38. Thus, a lower assembly of the vehicle damper 10 is constructed.

Then, as shown in FIG. 3B, the lower assembly assembled in the above-describe process is made penetrate from the lower side through the penetration hole 24 of the body panel 16, and then the upper damper mount 26, the upper sandwiching member 42a, the fastening plate 44c, and the washer 44b are externally fitted to the upper portion of the piston rod 18, which penetrates above from the body panel 16, to thereby install an upper assy. Incidentally, in advance, the protruding portion 30 is fixed to the lower side of the body panel 16, and the buffer member 52 is adhered to the lower portion of the protruding portion 30 by vulcanization.

Finally, As shown in FIG. 3C, a lock nut 44a constructing the fastening member 44 is fastened to the screw portion formed at the tip end portion of the piston rod 18, and the vehicle damper 10 is thereby installed to the body panel 16.

As has been described above, in the present embodiment, it is possible to easily and simply install the vehicle damper 10 to the body panel 16 by supporting the vehicle damper 10 at one point by the fastening member 44.

Incidentally, in the present embodiment, description has been made, taking an example of the vehicle damper 10 of a hydraulic type for which the damper body 14 is filled with pressure oil, not shown, however, the invention is not limited thereto. For example, arrangement may be made such that a suspension spring is provided in parallel on the outer diameter side of the damper body 14 coaxially with the damper body 14, and the end portion of the suspension spring is supported through a spring sheet (spring receiving member), not shown, fixed to the transfer member 46.

DESCRIPTION OF REFERENCE SYMBOLS

10 . . vehicle damper
12 . . damper main body
14 . . damper body
16 . . body panel (member on the vehicle body side)
18 . . piston rod
18a . . smaller diameter portion
20 . . stepped portion
22 . . washer (support member)
24 . . penetration hole
26 . . upper damper mount 26 (upper elastic body)
28 . . lower damper mount (lower elastic body)
30 . . protruding portion
36 . . cylindrical portion (extended portion)
40 . . collar member
42a, 42b . . sandwiching member
44 . . fastening member
46 . . transfer member
48, 50 . . collar (transfer member)
52 . . buffer member

The invention claimed is:

1. A mount structure for a vehicle damper including a damper main body configured by a damper body and a piston rod whose end portion is to be supported by a vehicle body member having a penetration hole through which the piston rod end portion penetrates, the mount structure comprising:
   an upper elastic body and a lower elastic body that are configured to be externally fitted to the piston rod and sandwich the vehicle body member;
   a collar member that is configured to be externally fitted to the piston rod, penetrates through the upper elastic body and the lower elastic body, and defines a tightening margin of the upper elastic body and the lower elastic body when these components are externally fitted to the piston rod;
   a pair of sandwiching members that are provided at end portions along an axial direction of the collar member and respectively sandwich the upper elastic body from an upper side of the upper elastic body and the lower elastic body from a lower side of the lower elastic body;
   a fastening member configured to integrally fasten the collar member, the upper elastic body, and the lower elastic body to the piston rod;
   a transfer member that is configured to be disposed coaxially with the piston rod and is sandwiched between the upper elastic body and the lower elastic body to transfer vibration force from a damper body side to the vehicle body member, and
   a protruding portion configured to protrude from a circumferential marginal portion of the penetration hole of the vehicle body member toward the damper body side, the protruding portion having a penetrating hole through which the piston rod end portion also penetrates and arranged such that an inner circumferential surface of the protruding portion which defines the penetrating hole thereof and faces toward the piston rod is in contact with either of the upper elastic body or the lower elastic body,
   wherein the transfer member is sandwiched between the lower elastic body and the protruding portion,
   and wherein either the upper elastic body or the lower elastic body includes an extended portion extended along the axial direction of the piston rod and located between the collar member, and at least one of the transfer member and the protruding portion.

2. The mount structure for a vehicle damper according to claim 1, wherein a surface of the transfer member is provided with an elastic buffer member, the surface of the transfer member facing the protruding portion.

3. The mount structure for a vehicle damper according to claim 1,
   wherein the piston rod includes a smaller diameter portion formed with a smaller outer diameter than another outer diameter of the piston rod, and a stepped portion provided between an inner end portion along an axial direction of the smaller diameter portion and a side surface of the piston rod having the other outer diameter, wherein the upper elastic body, the lower elastic body, the collar member, the sandwiching member, and the transfer member are configured to be externally fitted to the smaller diameter portion, wherein a support member for supporting a lower one of the sandwiching members at the stepped portion is configured to be provided between the stepped portion and the lower one of the sandwiching members, and wherein the support member is separately formed from the lower one of the sandwiching members or integrally formed with a lower surface of the lower one of the sandwiching members.

4. The mount structure for a vehicle damper according to claim 1, wherein the vehicle damper is an input separation vehicle damper.

5. The mount structure for a vehicle damper according to claim 1, wherein the protruding portion is configured to be fixed to the vehicle body member such that protruding portion protrudes from the circumferential marginal portion of the penetration hole of the vehicle body member.

6. The mount structure for a vehicle damper according to claim 1, wherein the protruding portion is a flat, ring-shaped member.

7. The mount structure for a vehicle damper according to claim 1, wherein the inner circumferential surface of the protruding portion which defines the penetrating hole thereof is in contact with the extended portion of either the upper elastic body or the lower elastic body.

8. The mount structure for a vehicle damper according to claim 1, wherein the protruding portion only contacts one of the upper elastic body and the lower elastic body.

9. The mount structure for a vehicle damper according to claim 1, wherein the protruding portion is directly sandwiched between and in contact with the extended portion of either the upper elastic body or the lower elastic body and the transfer member in a radial direction of the protruding portion.

10. A mount installation method for a vehicle damper including a damper main body configured by a damper body and a piston rod whose end portion is to be supported by a vehicle body member having a penetration hole through which the piston rod end portion penetrates, comprising steps of:

providing a protruding portion to a surface of the vehicle body member facing toward the damper body such that the protruding member protrudes from a circumferential marginal portion of the penetration hole of the vehicle body member toward the damper body, the protruding portion having a penetrating hole through which the piston rod end portion also penetrates, externally fitting a lower sandwiching member, a collar member, and a lower elastic body to the piston rod, and thereafter externally fitting a transfer member to the lower elastic body from above to construct a lower assembly; and inserting the lower assembly through the penetration hole of the vehicle body member and the penetrating hole of the protruding portion from below the vehicle body member and the protruding portion such that an inner circumferential surface of the protruding portion which defines the penetrating hole thereof and faces toward the piston rod is in contact with either of the upper elastic body or the lower elastic body, externally fitting an upper elastic body and an upper sandwiching member to the end portion of the piston rod from above the vehicle body member while the piston rod extends through the penetration hole of the vehicle body member, and thereafter fastening a fastening member to a tip on the end portion of the piston rod, wherein the transfer member is sandwiched between the lower elastic body and the protruding portion, and wherein either the upper elastic body or the lower elastic body includes an extended portion extended along the axial direction of the piston rod and located between the collar member, and at least one of the transfer member and the protruding portion.

11. The mount installation method for a vehicle damper according to claim 10, wherein the vehicle damper is an input separation vehicle damper.

12. The mount installation method for a vehicle damper according to claim 10, wherein the protruding portion is fixed to the vehicle body member such that protruding portion protrudes from the circumferential marginal portion of the penetration hole of the vehicle body member.

13. The mount installation method for a vehicle damper according to claim 10, wherein the protruding portion is a flat, ring-shaped member.

14. The mount installation method for a vehicle damper according to claim 10, wherein the inner circumferential surface of the protruding portion which defines the penetrating hole thereof is in contact with the extended portion of either the upper elastic body or the lower elastic body.

15. The mount installation method for a vehicle damper according to claim 5, wherein the protruding portion only contacts one of the upper elastic body and the lower elastic body.

16. The mount installation method for a vehicle damper according to claim 10, wherein the protruding portion is directly sandwiched between and in contact with the extended portion of either the upper elastic body or the lower elastic body and the transfer member in a radial direction of the protruding portion.

* * * * *